(12) United States Patent  
Namir

(10) Patent No.: US 9,805,039 B2
(45) Date of Patent: Oct. 31, 2017

(54) METHOD AND SYSTEM FOR ARCHIVING A DOCUMENT

(71) Applicant: Yoav Shalom Namir, Tel Aviv (IL)

(72) Inventor: Yoav Shalom Namir, Tel Aviv (IL)

( * ) Notice: Subject to any disclaimer, the term of this patent is extended or adjusted under 35 U.S.C. 154(b) by 0 days.

(21) Appl. No.: 14/090,416

(22) Filed: Nov. 26, 2013

(65) Prior Publication Data

US 2014/0222763 A1 Aug. 7, 2014

Related U.S. Application Data

(60) Provisional application No. 61/730,408, filed on Nov. 27, 2012.

(51) Int. Cl.
*G06F 17/30* (2006.01)
*G06F 7/00* (2006.01)

(52) U.S. Cl.
CPC .............. *G06F 17/30073* (2013.01)

(58) Field of Classification Search
USPC .......................................... 707/665
See application file for complete search history.

(56) References Cited

U.S. PATENT DOCUMENTS

| 6,678,705 | B1* | 1/2004 | Berchtold | ......... G06F 17/30011 |
| 7,723,581 | B2* | 5/2010 | Chungu | ................... A01H 5/10 435/430 |
| 8,396,854 | B2* | 3/2013 | Berard | ......................... 707/707 |
| 8,493,606 | B2* | 7/2013 | Phillips et al. | ............... 358/1.15 |
| 8,886,706 | B1* | 11/2014 | Tong et al. | ................... 709/203 |
| 9,489,380 | B2* | 11/2016 | Piersol | ............. G06F 17/30011 |
| 2004/0133629 | A1* | 7/2004 | Reynolds et al. | ............ 709/202 |
| 2004/0162842 | A1* | 8/2004 | Ono et al. | ...................... 707/100 |
| 2007/0112784 | A1* | 5/2007 | Blumenau | ........................ 707/10 |
| 2008/0281796 | A1* | 11/2008 | Prager et al. | ..................... 707/3 |
| 2011/0010356 | A1* | 1/2011 | Berard | .............. G06F 17/30011 707/707 |

* cited by examiner

*Primary Examiner* — Kuen Lu
(74) *Attorney, Agent, or Firm* — The Law Office of Joseph L. Felber

(57) ABSTRACT

An expert archiving machine and a remote client machine; the remote client machine being configured and operable to send the document over LAN, WAN or internet networks; and to send an archiving output data signal to the expert archiving machine, and the expert archiving machine being configured and operable: to receive the archiving signal and the document; and to perform a computerized service including: saving the document in a destination directory; thereby forming a saved document. In an embodiment, a file path to the saved document is determined autonomously by a computer procedure in accordance with a predetermined set of conditional archiving rules and an asset parameter data source or database.

14 Claims, 20 Drawing Sheets

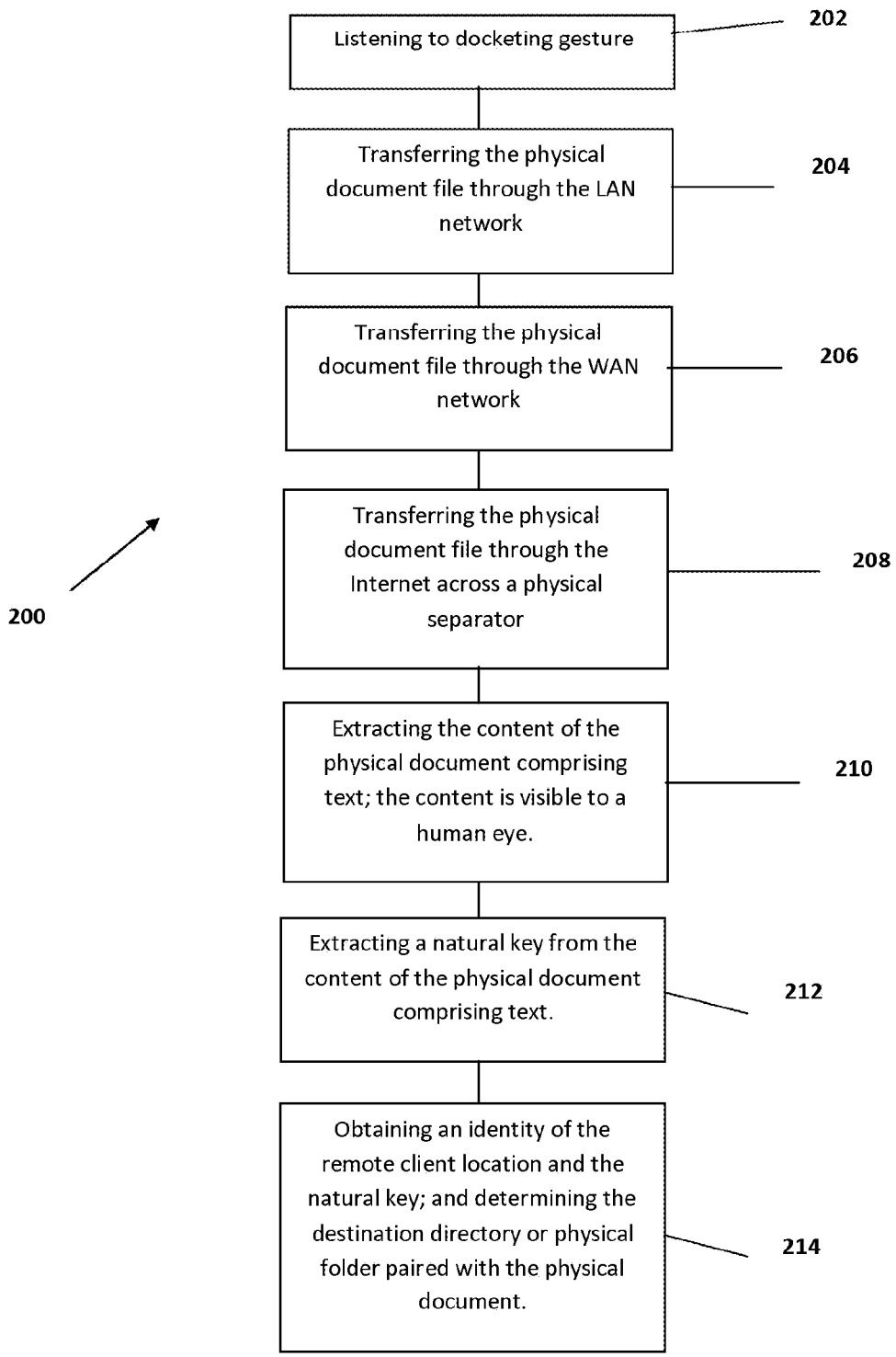

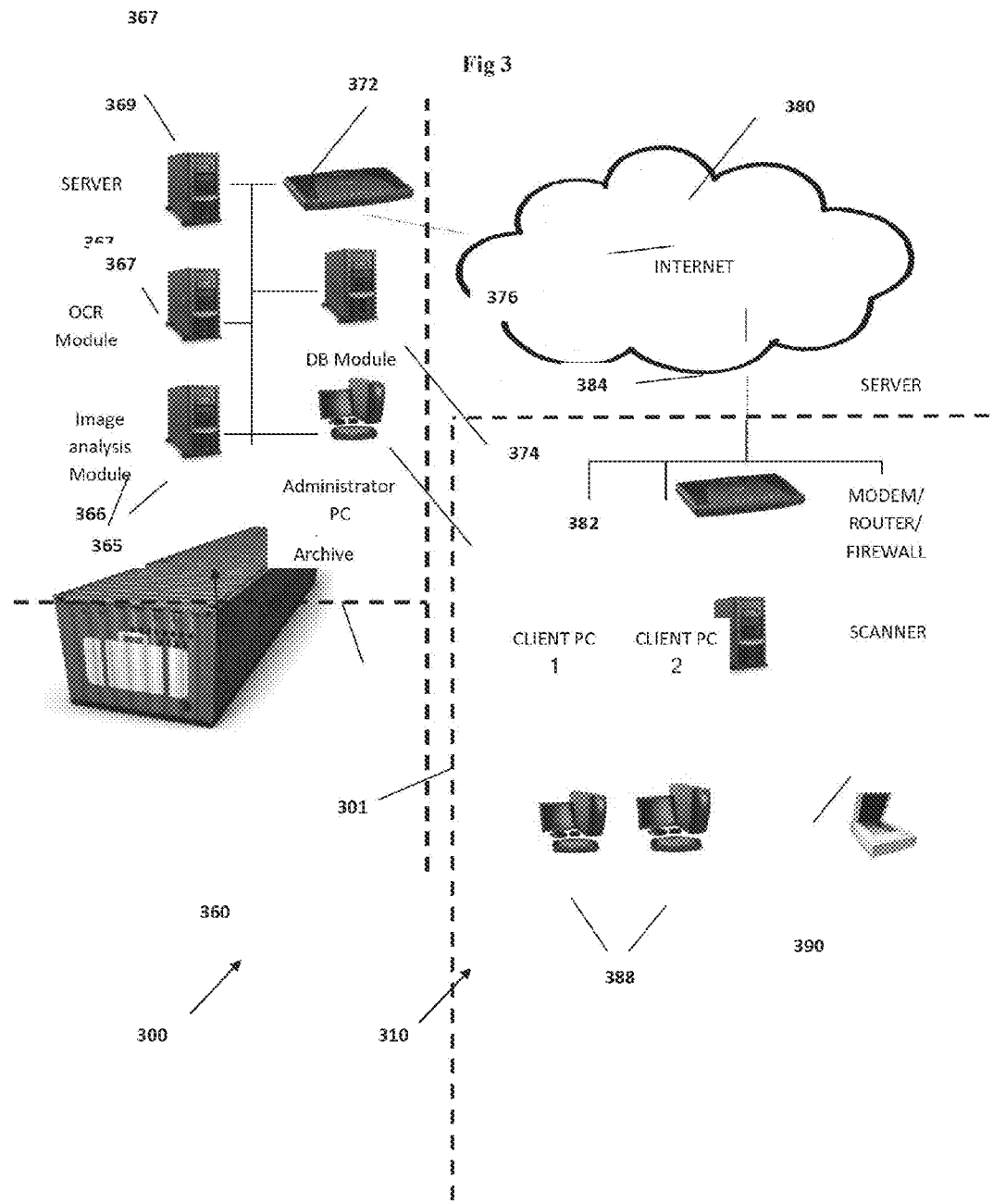

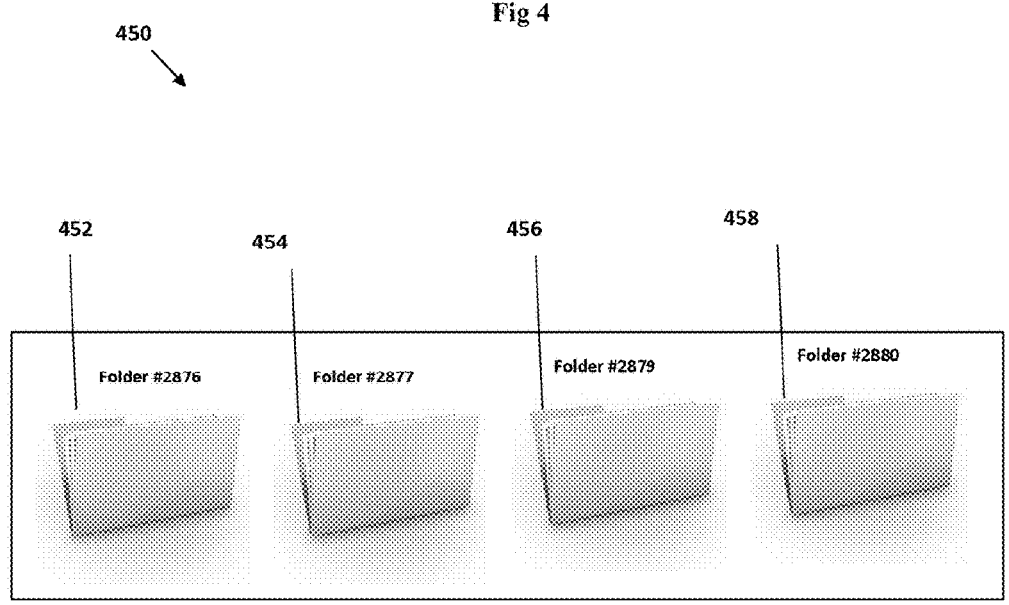

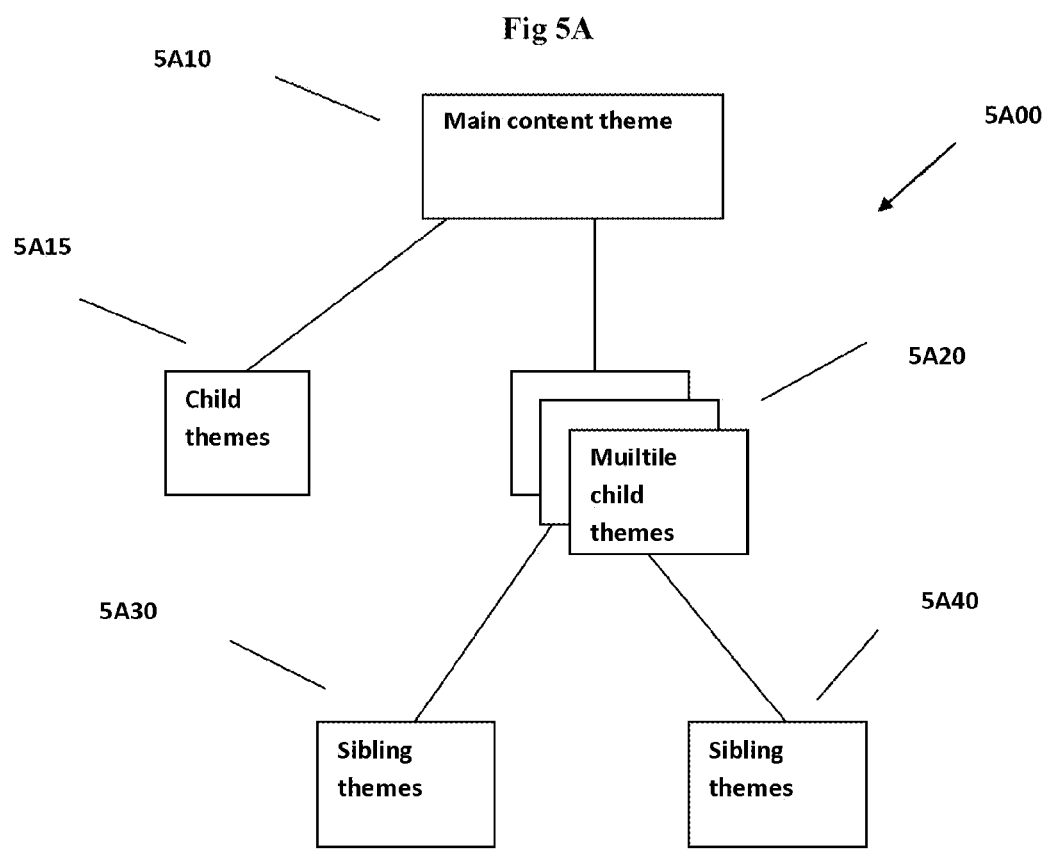

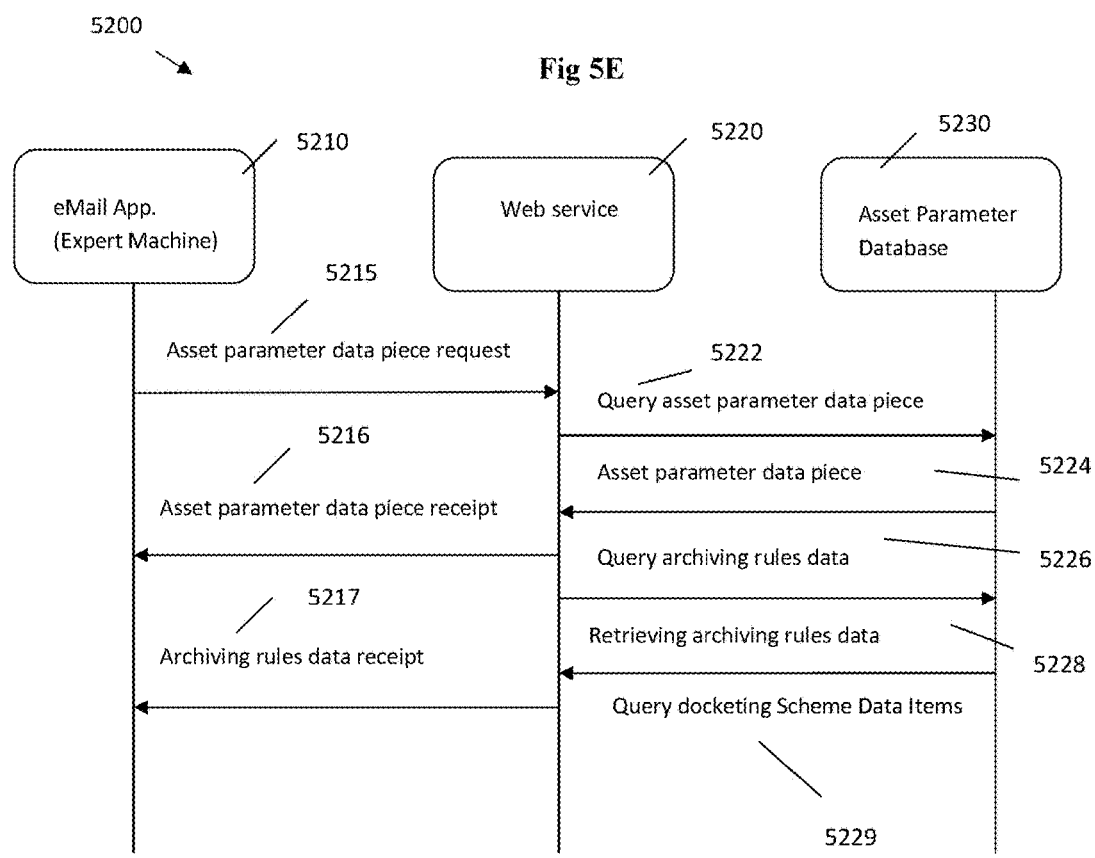

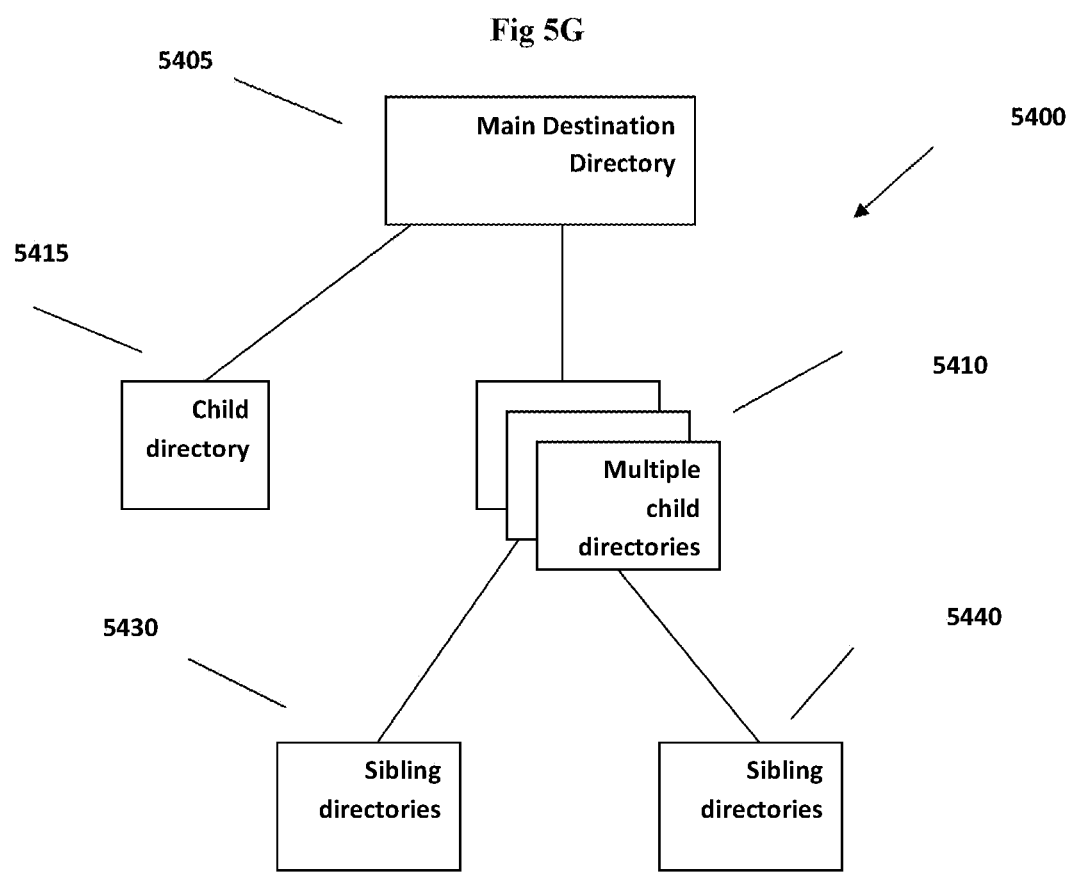

Fig 6

```
public class Document
{
    DocumentBase document = new DocumentBase();
    string innerText = null;

public string InnerText
    {
        get
        {
            return innerText;
        }
    } public Document(string s)
    {
        document.VarFullPathFileName = s;
        if (this.ip_class_types.File_types
                .Contains((string)document.Extension))
        {
            if (((string)document.Extension).ToLower() == ".doc" ||
                ((string)document.Extension).ToLower() == ".docx")
            {
                ...
                innerText =((DocumentDoc)(document)).ExtractText();
            }
            if (((string)document.Extension).ToLower() == ".txt" )
            {
                ...
                innerText =((DocumentTXT)(document)).ExtractText();
            }
            if (((string)document.Extension).ToLower() == ".msg")
            {
                ...
                innerText =((DocumentMSG)(document)).ExtractText();
            }
            if (((string)document.Extension).ToLower() == ".pdf")
            {
                ...
               innerText = ((DocumentPDF)(document)).ExtractText();
            }
            If ((document.Extension).ToLower()==Images.Extension)
            {   ..
                innerText =((DocumentTIFF)(document)).ExtractText();
            }
        }
    }
}
```

Fig 6A

```
public class InformationExtractor                    ———— 650
{
    Document document = null;
    InformationView iView = new InformationView();

public InformationExtractor(string s, int contact_id)
    {
        document = new Document(s);
        ReferencesDictionary.Add(contact_id);
    } public InformationView IView                  ———— 660
        {
            get
            {                                         ———— 665
                return iView;
            }
        }

```
       710              715
          \              \
class DocumentDoc : DocumentBase                              700
{
        object varFalseValue = false;
        object varTrueValue = true;
          object varMissing = Type.Missing;

public DocumentDoc(string s)
        {
            varFileName = s;
        }                                          720
                                            _____/
        public string ExtractText()  _____/
        {
            IO.FileInfo f = new IO.FileInfo((string)varFileName);
            WORDAUTOMATION.Document = ...

WORDAUTOMATION.Document.Analize();

StreamReader sr = new StreamReader((string)Wtmp_fTXT);

StringBuilder textBuilder = new StringBuilder();
            string _t = sr.ReadLine();
            while (_t != null)
                textBuilder.Append(_t);
                                                              730
            {

_t = sr.ReadLine();
            }
            sr.Close();

string res = textBuilder.ToString();

return res;
                         _____ 740
        }
    }
```

Fig 8

```
                810              815
                  \               \                                    800
                   \               \                                  /
class DocumentMSG : DocumentBase
    {
        email ml = new email();  ─────── 820 public DocumentMSG(string s)
        {
            varFileName = s;
        }
                                              820
        public string ExtractText() ───────/
        {
            System.IO.FileInfo f = new
                System.IO.FileInfo((string)varFileName);

ml.Open(f.FullName);
            string res = ml.Message.Body + "~" + ml.Message.Subject;
            ml.Close();

SaveFileTXT(res, this.FS.replace_ext(f.FullName,
                f.Extension, ".txt"));
            return res;
        }                  ─────── 830
    }
```

910           915        Fig 9
                                                                    900 class DocumentPDF : DocumentBase
    {
        PDFtoImage.PDFConvert converter = new PDFtoImage.PDFConvert();
        object varFalseValue = false;
        object varTrueValue = true;
        object varMissing = Type.Missing;

public DocumentPDF(string s)
        {
            varFileName = s;
        }                                            920 private void ConvertSingleImage(string fl, string dest)
        {
            PdfConversionTool.PdfDocument doc =
                PdfConversionTool.Pdf.IO.PdfReader.Open(fl);
            int c = doc.PageCount;

convert. MultipleType = true;
            convert.FitPage = true;
            convert.ResolutionX = 2800;
            convert.ResolutionY = 2600;
            convert.Format = "tiff";
            FileInfo f = new FileInfo(fl);
            string file_name = fl.Substring(0, fl.Length -
f.Extension.Length)+"-" + ".tiff";
            convert.perform(fl, file_name);
        } public string ExtractText()  ─────────  925
        {
            IO.FileInfo f = new System.IO.FileInfo(varFileName);
            ConvertSingleImage((string)varFileName,
                (string)varFileName);

...
            string tmpfolderpath = f.DirectoryName;
            string[] fls = Directory.GetFiles(tmpfolderpath);
            foreach (string fl0 in fls)
            {
                FileInfo ff = new FileInfo(fl0);
                if (ff.Extension.ToLower() == ".tiff")
                {
                    string fl_txt_name = ff.FullName.Substring(0,
                        ff.FullName.IndexOf(ff.Extension)) + ".txt";
                    txt = perform_OCR(fl0);
                    ...
                    SaveFileTXT(txt, fl_txt_name);
                }
            }
            return txt;   ─────────  930
        }
```

Fig 9A

```
private string perform_OCR(string file) ——————— 940
{
    List<string> output = new List<string>();
    OCRobj.Document obj = new OCRobj.DocumentClass();
    try
    {
        obj.Create(file);
    }
    catch (Exception e)
    {
        e.ToString();
    }
    obj.OCR();
    string txt = string.Empty;
    for (int i = 0; i < obj.Images.Count; i++)
    {
        txt += ((OCRobj.Image)(obj.Images[i])).Layout.Text;
    }
    obj.Save();
    obj.Close(false);

GC.Collect();
    GC.WaitForPendingFinalizers();
    return txt;
}
                                 950
}
```

Fig 10

```
                1010           1015                                          1000
                   \              \                                        /
class DocumentTIFF : DocumentBase
    {
        PDFtoImage.PDFConvert converter = new PDFtoImage.PDFConvert();
        object varFalseValue = false;
        object varTrueValue = true;
        object varMissing = Type.Missing;

public DocumentTIFF(string s)
        {
            varFileName = s;
        }

1020
        public string ExtractText()  ─────
        {
            IO.FileInfo f = new IO.FileInfo((string)varFileName);
            string txt = perform_OCR(f.FullName);

SaveFileTXT(txt,
                    this.FS.replace_ext(f.FullName,f.Extension,".txt"));
            return txt;
                        ─── 1030
        }
                                                            1040
        private string perform_OCR(string file)  ─────
        {
            List<string> output = new List<string>();
            OCRobj.Document obj = new OCRobj.DocumentClass();
            try
            {
                obj.Create(file);
            }
            catch (Exception e)
            {
                e.ToString();
            }
            obj.OCR();
            string txt = string.Empty;
            for (int i = 0; i < obj.Images.Count; i++)
            {
                txt += ((OCRobj.Image)(obj.Images[i])).Layout.Text;
            }
            obj.Save();
            GC.Collect();
            GC.WaitForPendingFinalizers();
            return txt;
        }
                                1050
    }
```

Fig 11

```
                1110                    1115
                   \                       \
                    \                       \                              1100
class DocumentTXT : DocumentBase                                          /
    {                                                                    /
        public DocumentTXT(string s)                                    ↙
        {
            varFileName = s;
        } public string ExtractText()——— 1120
        {
            System.IO.FileInfo f = new
    System.IO.FileInfo((string)varFileName);
            StreamReader sr = new StreamReader(f.FullName);
            StringBuilder textBuilder = new StringBuilder();
            string _t = sr.ReadLine();
            while (_t != null)
            {
                textBuilder.Append(_t);
                _t = sr.ReadLine();
            }
            sr.Close();

return textBuilder.ToString();   ——— 1130
        }
```

METHOD AND SYSTEM FOR ARCHIVING A DOCUMENT

RELATED APPLICATION

This application claims priority under 35 U.S.C. §119(e) to U.S. Provisional Application No. 61/730,408, filed Nov. 27, 2012, which is hereby incorporated by reference in its entirety.

FIELD OF THE INVENTION

This invention relates generally to archives and particularly to archiving system and methods in computer environments.

BACKGROUND OF THE INVENTION

Many professionals rely heavily on archive services both archiving of physical documents and files. These are typically performed with expensive overhead.

The economic loss which can result from loss of important document is a major drawback.

Asset Management Systems (AMs), such as Real Asset Management (RAM), is typically very complex issue to address. Asset portfolio management software packages provides non-transitory/transitory asset accounting, maintenance management and asset tracking solutions for commercial, government, education, not for profit, military, and healthcare organizations, ensuring regularly compliance e.g. US GAAP, SOX, Bill 198, GASB 34, IFRS and other corporate and government regulations.

Asset management further involves extensive correspondence in natural language with plethora of users, agents, providers and bystanders (other $3^{rd}$ parties). Incorporating the vast amount of the correspondence into the corporate AMs entails substantial overhead.

SUMMARY OF THE INVENTION

In one aspect, the present invention is directed an asset management system for electronically saving a document in a file system, the system comprising:

an expert archiving machine and a remote client machine; the remote client machine being configured and operable to (1) send the document over LAN, WAN or internet networks; and (2) send an archiving output data signal to the expert archiving machine, and the expert archiving machine being configured and operable: (1) to receive the archiving signal and the document; and (2) to perform a computerized service including: saving the document in a destination directory; thereby forming a saved document. In an embodiment, a file path to the saved document is determined autonomously by a computer procedure in accordance with a predetermined set of conditional archiving rules and an asset parameter data source or database.

In some embodiments, the archiving output data signal is sent in response to a user interface (UI) desktop gesture; the remote client machine being configured and operable to continuously listen to the user interface desktop gesture.

In an embodiment, the execution time, from the sending of the signal until the computerized service terminates and the saved document is formed, does not exceed a time frame of up to at least one selected from the group consisting of 5 seconds, 3 seconds, 2 seconds, 1 seconds, 500 ms, 200 ms or 50 ms.

In some embodiments, the computerized service further comprises querying for an asset parameter in the asset parameter data source being linked to the expert archiving machine, the first asset parameter is indicative of a preferred machine choice for the destination directory; and the destination directory is determined from the preferred machine choice exclusively by the server expert machine.

In some embodiments the computerized service further comprises querying a natural language readable content portion of the document for the asset parameter; the asset parameter is indicative of a preferred machine choice for the destination directory; and the destination directory is determined from the preferred machine choice exclusively by the server expert machine.

In some embodiments, the destination directory of the saved file is visible to the user; thereby allowing the user to view the file path to the destination directory.

In some embodiment, the destination directory comprises documents; wherein at least the majority of the documents are having natural language readable content portion comprising strings of characters indicative of the asset parameter.

In an embodiment, the user interface (UI) desktop gesture consists of one single gesture which initiates the computerized archiving service.

The computerized service can continuously be executed at least until the document is saved in the destination directory.

The remote client machine and user, is some embodiments, cannot interrupt, delete, intervene or cancel said computerized service at least until document is saved in the destination directory.

In yet another embodiment, the destination directory is a parent, child or sibling directory of a second destination directory.

The computerized service can exclude user intervention at least until the document is saved in the destination directory.

In some embodiment, the sending of the document over LAN, WAN or internet networks is performed over Post Office Protocol (POP), POP3 or a mail server protocol complying with POP or IMAP standards.

In other embodiments, the remote client machine is a virtual machine communicating with the expert archiving machine via remote desktop data protocol. The server remote desktop data protocol can be the Microsoft Remote Desktop Protocol (RDP).

In some embodiments, the destination directory comprises documents; wherein at least the majority of the documents are having natural language readable content portion comprising strings of characters indicative of the asset parameter.

In a first aspect, the present invention provides an operating system control configured and operable to raise an archiving event, the archiving event instantiate a data component including a reference to a document file; the event initiates a computerized archiving service including saving the document in a destination directory in accordance with a predetermined private set of archiving rules.

In a second aspect, the present invention provides an operating system control configured and operable to raise an archiving event, the archiving event instantiates a data component including a reference to a document file; the event initiates a computerized archiving service including saving the document in a private file system location in accordance with a predetermined set of conditional archiving rules.

The operating system control can be a window control. The operating system control can be a graphical user interface control.

In some embodiments, the archiving event is raised in response to a user interface (UI) desktop gesture. The control can be installed on a client machine. The hosting operating system can be configured and operable to continuously listen or to respond to the user interface desktop gesture.

In other embodiments, data includes identification of the client entity.

In some embodiments, the destination folder is a virtual folder.

In one of its main aspects, the present invention provides a system for electronically archiving a document in a file system, the system comprising:
  an expert archiving server and a remote client machine;
    the remote client machine is configured and operable to send the document over LAN, WAN and internet networks; and to send an archiving signal to the expert archiving server;
    the expert archiving server is configured and operable to receive the archiving signal and the document; and perform computerized archiving service including saving the document in a destination directory; the destination directory is determined or selected in accordance with a predetermined set of conditional archiving rules and an archiving scheme; wherein the archiving signal is sent in response to a user interface desktop gesture; the remote client machine is configured and operable to continuously listen or respond to the user interface desktop gesture.

In one embodiment, the gesture consists of one single gesture which initiates the computerized archiving service; wherein said archiving service continuously proceeds at least until the document is saved in the destination directory.

In a more specific embodiment, the gesture is selected from the group consisting of: click, double click; and drag and drop.

In another embodiment, the gesture includes pointing at the document utilizing a computer pointing apparatus.

In one embodiment, the document is not sent over Post Office Protocol (POP), POP3 or a mail server protocol complying with POP standard.

In another embodiment, the remote client machine comprises data indicative of a client entity and a module configured and operable for issuing an archiving output data including the client entity.

In yet another embodiment, the expert archiving server is configured and operable to decide the destination directory according to an extracted textual content of the sent document.

In some embodiments, the system of the present invention provides each client entity with a dedicated logical client zone. The remote client machine can be a virtual machine communicating with the archiving server over remote desktop data protocol.

In other embodiments, the remote desktop data protocol is Microsoft Remote Desktop Protocol (RDP).

The archiving server can receive the data indicative of client entity and determine the logical client zone. The server can prevent saving the document in a destination folder other than in the logical client zone.

In some embodiments, conditional archiving rules include rules for selecting a destination directory from a plurality of destination directories.

In some embodiments, the destination folder is a virtual folder.

The plurality of destination directories can each be exclusively paired to a logical client zone.

In some embodiments, the archiving server is configured and operable to decide the destination directory according to an extracted textual content of the document and the identity of the client such that the identity defines the logical client zone and extracted textual content defines the selected destination directory within the logical client zone.

In some embodiments, the remote client machine is configured and operable to view content themes paired to the destination directory.

In one embodiment, the paired content theme includes parent, child or sibling neighboring content themes.

In other embodiments, the paired content theme includes contacts items paired to the content theme.

In other embodiments, the paired content theme includes parent, child or sibling of neighboring content themes.

In other embodiments, the paired content theme includes hot links to parent, child or sibling of neighboring content themes; the hot links provide remote access to the neighboring content themes.

In other embodiments, the paired content theme includes predetermined archived documents.

In other embodiments, the paired content theme includes predetermined system notifications. The predetermined system notifications can include dates. The date is retrieved from a DB module. The date is determined from the extracted textual content of said predetermined archived documents.

The destination directory can be separated from remote client machines or user via a file-system wall as defined herein.

In another embodiment, the destination directory receives the file from a demilitarized file zone as defined herein.

In some embodiments, the remote client machine or user is configured to lack at least two security file (or directory) permissions in the destination directory, said security permission is selected from the group consisting of: read, write, view or execute permission. In yet another embodiment, the remote client machine and user cannot interrupt, delete, intervene or cancel the archiving procedure at least until document is saved in the destination directory.

In another embodiment, the remote client machine is configured and operable to process saving statements or commands which do not include a string consisting of destination directory or destination path.

In some embodiments, the expert archiving server is running an application or service configured and operable to receive archiving signals; and to determine the string that includes a destination directory according to the archiving scheme. In other embodiments, the application or service is a remote procedure listening to a remote procedure call from remote client machines; the remote procedure call was invoked by a computer application in response to the archiving gesture.

In another embodiment, the application or service is a web service listening to remote calls over the internet from the remote client machine; the web service was invoked by a computer application in response to the archiving gesture.

In some embodiments, the expert archiving server is running an application or service configured and operable to determine the string that consist of the destination directory said determination is deduced from the content of the document.

In yet another embodiment, the content is printed, tabulated and edited for human consumption.

In another embodiment, the system comprises multiple remote client machines or users.

In other embodiments, the destination directory is determined according to the identity of the remote client machines or users.

In other embodiments, the system further comprises a mirror physical archive such that each saved document is further printed and stored in the mirror physical archive.

In some embodiments intellectual property material is archived.

In a second aspect, the present invention provides method for electronically archiving a document in a file system, the method comprising:

sending the document over LAN, WAN and internet networks from a remote client machine;

sending a archiving signal to an expert archiving server from the remote client machine;

receiving the archiving signal and the document by the expert archiving sever;

performing computerized archiving service including saving the document in a destination directory, in accordance with a predetermined set of conditional archiving rules; wherein the archiving signal is sent in response to a user interface desktop gesture; the remote client machine is continuously listening to the user interface desktop gesture.

In some embodiments, the destination folder is a virtual folder.

In one embodiment, the gesture consists of one single gesture which initiates the computerized archiving service; wherein said archiving service continuously proceeds at least until the document is saved in the destination directory.

In a more specific embodiment, the gesture is selected from the group consisting of: click, double click; and drag and drop.

In another embodiment, the gesture includes pointing at the document utilizing a computer pointing apparatus.

In one embodiment, the document is not sent over Post Office Protocol (POP), POP3 or a mail server protocol complying with POP standard.

In another embodiment, the remote client machine comprises data indicative of a client entity and a module configured and operable for issuing an archiving output data including the client entity.

In yet another embodiment, the expert archiving server is configured and operable to decide the destination directory according to an extracted textual content of the sent document.

In some embodiments, the system of the present invention provides each client entity with a dedicated logical client zone. The remote client machine can be a virtual machine communicating with the archiving server over remote desktop data protocol.

In other embodiments, the remote desktop data protocol is Microsoft Remote Desktop Protocol (RDP).

The archiving server can receive the data indicative of client entity and determine the logical client zone. The server can prevent saving the document in a destination folder other than in the logical client zone.

In some embodiments, conditional archiving rules include rules for selecting a destination directory from a plurality of destination directories.

In some embodiments, the destination folder is a virtual folder.

The plurality of destination directories can each be exclusively paired to a logical client zone.

In some embodiments, the archiving server is configured and operable to decide the destination directory according to an extracted textual content of the document and the identity of the client such that the identity defines the logical client zone and extracted textual content defines the selected destination directory within the logical client zone.

In some embodiments, the remote client machine is configured and operable to view content themes paired to the destination directory.

In one embodiment, the paired content theme includes parent, child or sibling neighboring content themes.

In other embodiments, the paired content theme includes contacts items paired to the content theme.

In other embodiments, the paired content theme includes parent, child or sibling of neighboring content themes.

In other embodiments, the paired content theme includes hot links to parent, child or sibling of neighboring content themes; the hot links provide remote access to the neighboring content themes.

In other embodiments, the paired content theme includes predetermined archived documents.

In other embodiments, the paired content theme includes predetermined system notifications. The predetermined system notifications can include dates. The date is retrieved from a DB module. The date is determined from the extracted textual content of said predetermined archived documents.

The destination directory can be separated from remote client machines or user via a file-system wall as defined herein.

In another embodiment, the destination directory receives the file from a demilitarized file zone as defined herein.

In some embodiments, the remote client machine or user is configured to lack at least two security file (or directory) permissions in the destination directory, said security permission is selected from the group consisting of: read, write, view or execute permission. In yet another embodiment, the remote client machine and user cannot interrupt, delete, intervene or cancel the archiving procedure at least until document is saved in the destination directory.

In another embodiment, the remote client machine is configured and operable to process saving statements or commands which do not include a string consisting of destination directory or destination path.

In some embodiments, the expert archiving server is running an application or service configured and operable to receive archiving signals; and to determine the string that includes a destination directory according to the archiving scheme. In other embodiments, the application or service is a remote procedure listening to a remote procedure call from remote client machines; the remote procedure call was invoked by a computer application in response to the archiving gesture.

In another embodiment, the application or service is a web service listening to remote calls over the internet from the remote client machine; the web service was invoked by a computer application in response to the archiving gesture.

In some embodiments, the expert archiving server is running an application or service configured and operable to determine the string that consist of the destination directory said determination is deduced from the content of the document.

In yet another embodiment, the content is printed, tabulated and edited for human consumption.

In another embodiment, the system comprises multiple remote client machines or users.

In other embodiments, the destination directory is determined according to the identity of the remote client machines or users.

In other embodiments, the system further comprises a mirror physical archive such that each saved document is further printed and stored in the mirror physical archive.

The aspects of the present invention can be applied to $3^{rd}$ party document. i.e. document files created by $3^{rd}$ parties. In this regard, $3^{rd}$ party document is a document created by an application which is not affiliated with the system, controls and methods of the present invention.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 2 depicts a schematic overview of exemplary archiving service 200 in accordance to the teaching of the present invention.

FIG. 3 is a schematic overview of a system in accordance with the present invention. An exemplary deployment of the server and remote client machines in accordance with an embodiment of the present invention is shown.

FIG. 4 is a schematic overview of physical mirror archive according with the present invention.

FIG. 5 is an exemplary hash table mapping physical folders to destination.

FIG. 5A is an exemplary hierarchal content theme of the present invention.

FIG. 5E is an action diagram illustrating example interaction between an application and as asset parameter database according to some embodiments.

FIG. 5G depicts a schematic overview of an exemplary destination directories collection according to embodiments.

FIGS. 6-6A by way of non-limiting example abstract document object according with the present invention.

FIG. 7 is a non-limiting example of an abstract MS DOC object according with the present invention.

FIG. 8 is a non-limiting example of an abstract email object.

FIGS. 9-9A is a non-limiting example of an abstract PDF object.

FIG. 10 is a non-limiting example abstract TIFF image object.

FIG. 11 is a non-limiting example abstract TXT image object according with the present invention.

DETAILED DESCRIPTION OF SOME NON-LIMITING EMBODIMENTS

Figure 1:
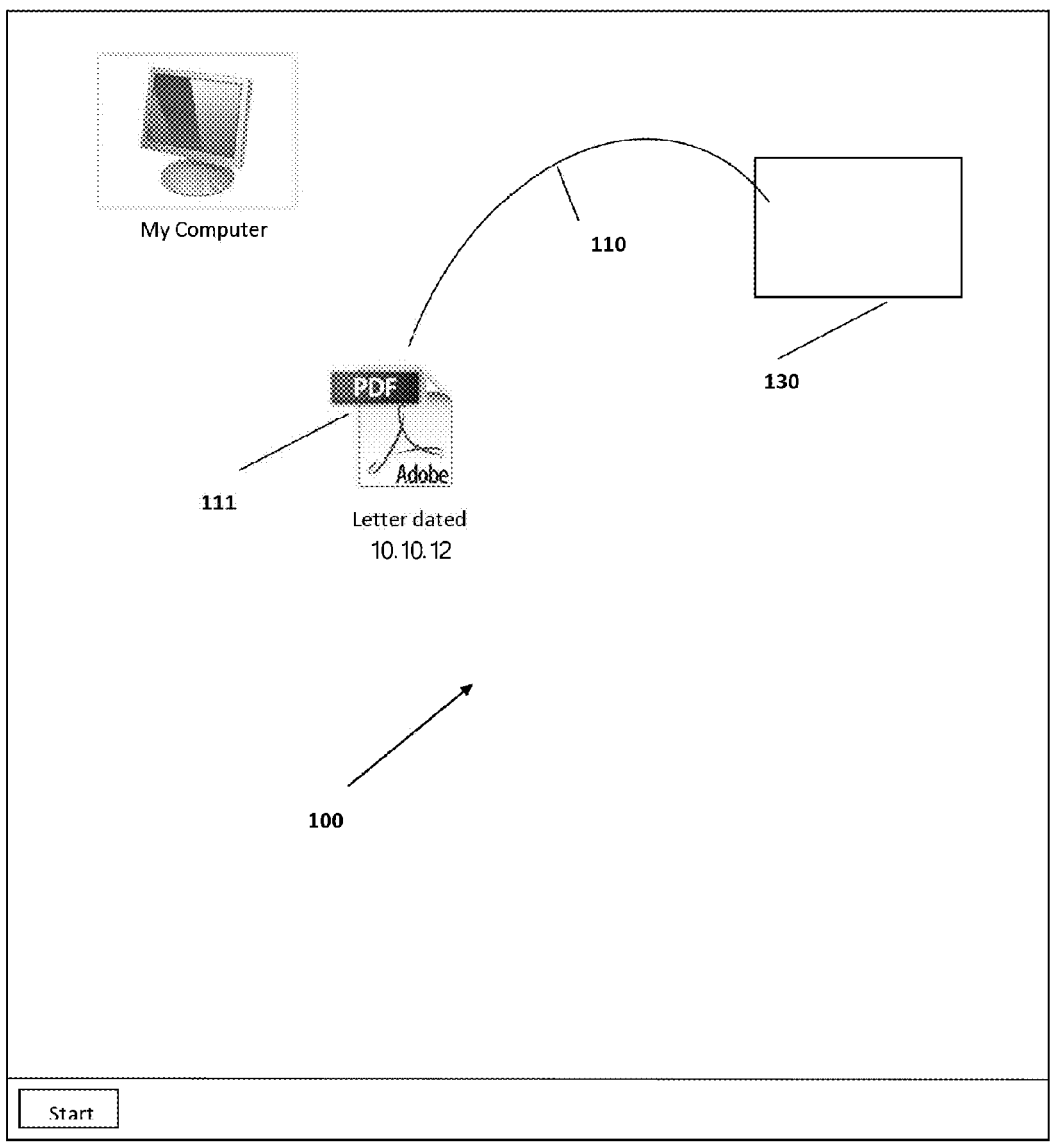
FIG. 1 is a schematic image view of a remote client machine desktop in accordance with an embodiment of the present invention.

In accordance with the present invention, the term "remote" in reference to "local" shall refer to physically and geographically separated non overlapping physical locations situated at some distance away. "Local", "local site" and "local location" in reference to "remote", "remote location", respectively merely refers to geographic separated non overlapping geographic locations.

The term "client location" or "remote client location" refers to a single or multiple locations where a document intended for docketing is available before the archiving. The remote client locations must a client PC linked to a network accessible and connected to the internet.

"Autonomous" shall mean not being controlled by a natural human agency. In the present invention a file path (or file system location) to the saved document is determined autonomously by a computer implemented program i.e. where a user performs a desktop gesture, the autonomous computer implemented method determines the complete file system location or file path (relative or absolute), the document is saved in the determined file system location without the user having authority to intervene, or to specify the file path differently. Therefore, the present invention, inter alia, teaches a machine which manages the determination of file system locations autonomously on the basis of business information stored in asset parameter databases.

A "machine" shall have the ordinary meaning in the computing field. A computer is typically a general purpose device that can be programmed to carry out a set of arithmetic or logical operations. Conventionally, a computer consists of at least one processing element, typically a central processing unit (CPU) and some form of memory. It can operate as servers, client and alike. The term "machine" shall encompass personal computer and virtual machine e.g. Microsoft® Virtual Machine, Hyper-V® and VMWARE® virtual machines.

A client is a piece of computer hardware or software that accesses a service made available by a server. The server is often on another computer system, in which case the client accesses the service by way of a computer network.

The expert archiving machine of the present invention is typically a local machine apart from a remote machine.

A "file path" specifies a unique location in a file system. A path points to a file system location by following the directory tree hierarchy expressed in a string of characters in which path components, separated by a delimiting character, represent each directory. The delimiting character is most commonly the slash ("/"), the backslash character ("\"), or colon (":"), though some operating systems may use a different delimiter. Systems can use either absolute or relative paths. A "full path" or "absolute path" is a path that points to the same location on one file system regardless of the working directory or combined paths. It is usually written in reference to a root directory. A "relative path" is a path relative to the working directory of the user or application.

An "asset" is tangible or intangible that is capable of being owned or controlled to produce value and that is held to have positive economic value. Assets herein represent value of ownership that can be converted into cash (including cash). For example, the balance sheet of a firm records the monetary value of the assets owned by the firm. An asset is cash and other valuables belonging to an individual or business. Two major asset classes are tangible assets and intangible assets. Tangible assets contain various subclasses, including current assets and fixed assets. Assets include inventory, while fixed assets include such items as buildings and equipment.

An "asset parameter" shall identify a characteristic, a feature, a measurable factor, or a key identifier of an asset. The asset parameter can be a risk category, aspect of field of engagement of an asset. Asset shall encompass bonds, shares and other bank instruments. Asset parameter(s) are typically stored in data sources, such as but not limited to, databases systems (e.g. Microsoft® SQL SERVER, ORACLE® DB engines etc'). These data sources typically maintain asset portfolios which can be both complex and extensive.

An "archiving rule" is computer implemented conditional rule which defines the destination directory for a document to be archived. In some embodiments, the conditional rule can comprise an asset parameter which is stored in the asset parameter data source. The asset parameter can thus be queried by, for example, SQL statements. In some embodiment, the execution of an archiving rule involves querying the asset parameter data source. The conditional rule can specify condition in IF-THEN schema. For example, IF an asset parameter exist then a numerical score for the asset parameter is outputted. IF, for example, a score threshold is exceeded, THEN an output string of a predetermined destination directory is obtained. In the present invention, execution of archiving rule further encompasses execution of plurality of archiving rules.

A "private file system location" is a file system location inaccessible for an archive user to change. A "hidden file system location" is a file system location inaccessible for an archive user to view. A "sec" shall mean second. An "ms" is millisecond.

In some embodiments, the asset is a legal asset. In other example, the asset is a representation of a chose-of-action. In another embodiment, the asset is an intellectual property asset being selected from the group consisting of a copyright, a trademark, a design patent and a patent. In some embodiment, the asset parameter is a serial number of court proceedings. In some embodiments, the asset is a patent application serial, or a reference serial id.

"POP" and "IMAP" shall mean Post Office Protocol (POP) is an application-layer Internet standard protocol used by e-mail clients to retrieve e-mail from a remote server over a TCP/IP connection. POP and IMAP (Internet Message Access Protocol) are the two most prevalent Internet standard protocols for e-mail retrieval. Most mail service providers such as Google Mail, Microsoft Mail and Yahoo! Mail provide both an IMAP and POP3 service (POP version 3).

A "natural key" is a key is formed of attributes or string of characters. A natural key of the present invention is visible and is printed as part of the content of the document. In some embodiments, the natural key is a reference number printed on the physical document (or reproduction of the document) intended for docketing. In some embodiments, a natural key of the present invention is edited and tabulated. In some embodiment, the natural key must be visible to a naked human eye e.g. font size of above 1 mm on the flat physical document.

In some embodiments, each natural key can be paired to a destination directory or local server directory. In one embodiment, a natural key is paired one-to-one with the destination directory. In some embodiments, a bijection function is used; the input of each is a natural key, and the output is the paired destination directory.

The term "physical archive" or "local archive location" refers to the system geographically remote and separated from the remote client location. A local archive location includes a server, a DBMS, a client PC linked to computer network allowing access and connectivity to the internet and thus to the remote client location via LAN, WAN. In some embodiments, the local archive location hosts physical folders which maintain physical copies of documents which were archived. In some embodiments, each physical folder is paired to a destination directory. In some embodiments, each physical folder maintains an identical full image (or copy) of the paired destination directory content.

In some embodiments, the archiving server is running an application or service configured and operable to receive archiving signals; and to determine a file system path of a destination directory. In other embodiments, the application or service is a remote procedure listening to a remote procedure call from remote client machines; the remote procedure call was invoked in response to the archiving gesture performed on the desktop of the remote client machine.

In another embodiment, the application or service is a web service listening to remote calls over the internet from the remote client machine; the web service was invoked in response to the archiving gesture performed on the desktop of the remote client machine.

The term "document" shall have its ordinary meaning of a paper-like flat document. The present invention is directed to provide a docketing scheme for documents which are intended for archiving from a remote client machine to an archive location.

Each physical folder can be paired to a destination directory such that the content of the physical folder is stored in the paired destination directory. In one embodiment, a physical folder is paired one-to-one with the destination directory.

The term "filesystemwall", and "file-system wall" refers to a technological barrier designed to prevent unmanaged storage, retrieval or view of an archived document by an archive user. It comprises security configurations supported by computer implemented methods installed on the archiving server.

"Demilitarized file zone" (herein firstly coined as "DMFZ") is a predetermined memory resource perimeter for receipt of documents from an un-trusted LAN and WAN networks; the DMFZ is configured and operable to transport the received document files to the determined destination directories.

"Archive scheme" is a set of conditional constructs implemented by computer software and/or hardware. The archive scheme can determine the destination of the document to be docketed according to the identity of the remote client machine. The archive scheme can determine the destination of the document to be docketed according to a natural key; the natural key is read from the content of the document. This can be implemented for example by a table decoding each natural key to a destination directory. In addition, the natural key can be a continuous and non-continuous string template which can be read from the content of the document.

A "combo box" is a commonly used graphical user interface window control. This term shall have its ordinary meaning in the art (desktop application design in windows-like environments). It is a combination of a drop-down list or list box, allowing the user to either type a value directly into the control or choose from a list of existing options.

A "list box" is a graphical user interface window control that allows the user to select one or more items from a list contained within a static, multiple line text items.

In the realm of the present invention, a "content theme" is the central topic, subject, or object of an office environment where the archiving system of the present invention is deployed. Content themes are defined in the archiving system setting at the deployment of archiving system and thereafter. The archiving systems and methods of the present invention pairs a selected destination folder for each content theme instance such that upon an archiving event, the archiving server determines the paired destination folder and saves the document in the paired (or selected) destination folder.

In the present invention, content theme instances in the office environment can be hierarchal i.e. the relations of content theme instances are represented by a graph data structure (or specifically by a tree data structure). By way of non-limiting example, FIG. 5A shows a graph having content theme instances as nodes 5A10, 5A15, 5A20, 5A30 and 5A40. The relationship between content theme instances is represented by an edge which connects the respective content theme instances. For example, the content theme instance 5A15 is a child content theme of 5A10; content theme instance 5A30 is a sibling of content theme instance 5A40; the parent of both is the content theme instance 5A20.

By way of non-limiting example, in an insurance company, a claim file structure can be a content theme. The content theme of the client can be recurrent and recognizable in the respective office environment.

In some embodiments, the remote client machine invokes the docketing procedure in accordance with the docketing scheme. In some embodiments, the archive scheme determines the destination of the document to be archived according to the natural key extracted from the textual content of the document intended for docketing.

FIG. 1 depicts a schematic overview of a client remote desktop 100 of the client machine, showing graphical user interface together with a generic task bar. The system of the present invention provides means for transferring a document represented by a file from a remote client machine to a local computer environment namely the archiving server.

A remote client is typically located at the remote client location 310. A scanner 390 can be used to produce a PDF version of the physical document intended for archiving and docketing. In order to complete the archiving process, the client is merely required to make a docketing gesture 110.

The docketing gesture is performed on the remote client PCs 388. The docketing gesture 110 can be associated with a document e.g. the document 111. The docketing gesture can be a drag and drop gesture dragging the document 111 across the desktop to point at the docketing icon 130.

The docketing gesture raises a docketing event in the local archive location 310 engaging the server 369 to listen to the arrival of the document. In some embodiments, the event provides further data indicative of client entity. The server utilizes the data indicative of client entity to select and determine a logical client zone of the client entity. The document will be archived in a destination directory within the logical client zone. The destination directory will be determined from a plurality of destination directories in accordance with archiving rules.

The file can be parsed to portions or segments to allow reliable transport. The document file is extracted to produce the textual readable elements from the content of the document.

An image module 366 can be used to extract the graphic image of the file. For example, a document page can be represented by a TIFF format file. Such image can be produced by a scanning method which obtains the photographic-like image of the flat document.

Multipage document, for example, can be represented by an ordered sequence of TIFF format files: each page is represented by a TIFF photographic-like image. OCR module 367 can be used to extract text from the images. Both modules 367 and 366 can be used to extract text from the images of transported document.

In some exemplary embodiments, the docketing gesture is a drag and drop gesture. In computer graphical user interfaces, drag and drop is a pointing device gesture in which the user selects a virtual object by "grabbing" it and dragging it to a different location or onto another virtual object.

In one embodiment, drag and drop gesture is a pointing device gesture in which the user selects a virtual object representing the document by "grabbing" it and dragging it to a different location representing the local archive server. The drag and drop gesture is used to invoke the archiving procedure and create an association between two abstract objects, the document and the archiving procedure, respectively.

The docketing gesture is typically performed with a mouse or other pointing apparatus; and comprises the following sequence: moving the pointer to the object representing the physical document file; pressing, and continuously holding down, the button on the mouse or other pointing apparatus; dragging the object to the desired location; and "droping" the object by releasing the button.

FIG. 2 depicts a schematic overview of exemplary archiving service 200 in accordance with the teaching of the present invention. A module or an application executed on the client machine listens to the docketing gesture 202 which is actuated on the client desktop 100. The docketing gesture includes information identifying the document such as a reference. The file is transferred over LAN, WAN and Internet networks across a physical separator 204, 206 and 208.

Content is extracted from the document. The content is readable and visible to a human eye. The content consists printed text that is tabulated and edited for human use (or consumption) and comprising [A-Z] [0-9] [a-z] characters.

Page images of the archived document can be produced utilizing an image analysis module. The image analysis module produces photographic-like scanned images of the document. The OCR module and the text processing module can be used to convert a flat paper-like document to an image file and extract text from the images the document.

In some embodiments, the extraction procedure 212 is used to extract the natural key from the document. The natural key is used to determine the destination directory or the physical folder 214.

The data indicative of client entity can also be received by the archiving server. The server utilizes the data to select and determine a logical client zone of the client entity. The document intended for docketing will be saved only in within the logical client zone. The destination directory will be determined from a plurality of destination directories in accordance with archiving rules.

The document file is identified or authenticated as a document related to a destination directory in the archiving facility. The document file is thereafter stored in the in a remote server destination directory. A DB module in the archive location is updated with the presence of the recently docketed file. The system invokes a docketing event. An administrator machine indicates to the administrator by graphical user interface control that a document was recently docketed allowing human intervention in the process, if required.

FIG. 3 depicts a schematic overview of a sample system 300 in accordance to the teaching of the present invention. The system comprises a remote client location 310 and a local archive location 360.

The local archive location is associated a network server 369 which is linked to the internet network 380 via modem router 372. Alternatively, a separate modem can be used as a network bridge to connect the internet through WAN. The local archive location is linked via LAN and WAN networks to the internet.

The remote client location 310 is also associated with a network server 384 which is linked to the internet network 380 via modem router 382. The modem can also be used as a network bridge to connect with a separate router 382. The remote client location 310 is linked via LAN and WAN networks to the internet. The remote client location 310 and the local archive location 360 are separated by a physical location separator 301 i.e. remote client location 310 and a local archive location 360 are physically and geographically separated.

In some embodiments, the archiving server is configured and operable to serve multiple client entities. For exemplification purposes, the client entity can be a law firm, intellectual property office, and other corporate entities. In some embodiments, the system server is configured and operable to serve multiple client machines or users.

In one embodiment, each client entity is logically paired to logical client zone. The latter is intended to separate destination directories of different client entities. In such an embodiment, the remote client machine reflects (or publishes) the respective client entity to the archiving server. This information is used by the archiving server to direct the incoming document to the appropriate logical client zone, as illustrated herein.

Logical client zones of the present invention are enumerated and paired to clients. In turn, the document of the client in issue will be archived in his respective logical client zone. The archived document will be archived is association with the logical client zone enumeration.

FIG. 4 is a schematic exemplary overview of the physical archive 450. The physical archive is situated in a physical space and maintains physical folders 452, 454, 456 and 458. Physical folders 452, 454, 456 and 458 are working example. In fact a physical archive can maintain more the exemplified physical folders. The physical archive can be situated in a perimeter of the archive location.

The physical archive can function as a physical content mirror of the computer file system i.e. each physical folder in the physical archive maintains the entire content of the corresponding destination directory.

FIG. 5 shows an exemplary table pairing file system directories to the corresponding physical folders, logical client zones and destination directories nos. As can been observed, for example, directory path \\server\A498CC is uniquely paired with physical folder #2880 and natural key mnjhgdv, and logical client zone 4. In another example, destination directory \\server\A49850 is uniquely paired with physical folder 2879 and natural key 36dyxghb and logical client zone identifier 3. Such table is programmatically created. Alternatively, relational database can be used to maintain such table. In such a case, a table can be defined by 4 sequential strings representing the file system destination directories 554, the corresponding physical folders nos. 562, logical zone identifier 560 and natural keys 558.

An object model is further provided to define an abstract document. The model is implemented with object oriented programming platform to provide a universal interface to extract content. In this manner, documents can be remotely archived regardless of their type or format. The document can be a word document, PDF, images (such as but not limited to tiff and jpg) and other text processing applications.

The text processing modules can be implemented for example by object modeling of an interface. Each document object or class according to the present invention implements the interface of text extraction i.e. each type with the respective interface implementation. It should be noted that each type of document provides a specific dedicated format and tabulation. The document objects of the present invention thus expose a public property or interface shared by all documents objects of the invention.

In case a new type of document is introduced to the market, implementation of the specific text content interface is required. After implementing the text extraction interface, the archiving server can archive the new type of document.

This invention therefore provides a universal archiving model which is flexible to archive documents is diversity of formats and types.

In one embodiment, the present invention provides a system which instantiate the abstract object representing the document to be archived and retrieve the suitable text extraction interface. By way of non-limiting example, abstract document 600 is shown.

In some embodiments, the object comprises a memory reference to a memory location where the text (i.e. inner text of the document) is stored. The text is ready for content analysis. The text typically includes information comprising natural keys.

The abstract document object is capable of reflecting whether the document is selected from a predetermined group of authorized document typed classes.

The type can be a word processing document. The word processing document can be a MS Word™ document or a open Office™ document. The type can be a mail object such as an email message. The type can also be a Portable Document Format, PDF or Adobe™ PDF. In a non limiting example, FIG. 6 shows a document abstract class. In a non limiting manner, the text extraction interfaces is implemented by child document object classes that will be shown herein.

FIGS. 6-6A shows an exemplary information extraction abstract object 600. This object includes access to the extraction process e.g. ExtractText( ) 620, 625, 630, 635, 640 and the inner text extraction interface/property 615. Thus, the object model provides a universal handling approach to archive document from a diversity of document types and formats.

Reflecting the type class of the document can be performed in accordance to the name of the file, for example by identifying the extension of the file name. The abstract object also is configured to invoke method or interface which performs a text extracting procedure.

An imaged document can also be analyzed in accordance with the methods of the present invention. An imaged document is a photocopied document or a scanned document. For example, the imaged document can be an image file in .TIFF format. The image file can be extracted by calling for example an OCR based algorithm based method.

The OCR method is typically based on vector analysis of the image file representing the layout flat document. The OCR method can be an implemented method of an OCR module 267.

A MS WORD™ (i.e. Word document) can also be analyzed in accordance with the methods of the present invention. A Word document represents documents in a manner independent of application software, hardware, and operating systems. Each Word document file encapsulates a complete description of a fixed-layout flat document, including the text, fonts, graphics, and other information needed to display it. The Word document can be extracted by calling for example an algorithm based method filtering out fonts and graphics obtaining the respective text within said document and returns the string; the string represents the text of the Word document. Word document analysis method is for example as shown in FIG. 7. FIG. 7 shows an exemplary WORD DOC abstract class 700, 710. This class is typically an inherited class 715. The WORD DOC abstract class 700 implements the text extract process 720 which produced the output textual content of the MS Word Document 730, 740.

An email document (i.e. a email) can also be analyzed in accordance with the methods of the present invention. An email can be an .msg file created by MS Outlook™ Each MS Outlook™ file encapsulates a complete description of email document, and it can include the text, fonts, graphics, attachments and other information. The email can be extracted by instantiating an email object such an MS Mail Items and calling a specifically configured method to extract, for example, the message or title of the email. The message or title of the email is typically exposed properties of the mail objects. The method is configured to collect the respective text within each of said properties; and return the string; the string represents the text of the email. Email documents analysis method is for example as shown in FIG. 8. FIG. 8 shows an exemplary email abstract class 800, 810. This class is typically an inherited class 815. The email abstract class 800 implements the text extract process 820 which produces the output textual content of the email 730, 740.

A document in PDF format (i.e. a PDF) can also be analyzed in accordance with the methods of the present invention. A PDF format is a file format used to represent documents in a manner independent of application software, hardware, and operating systems. Each PDF file encapsulates a complete description of a fixed-layout flat document, including the text, fonts, graphics, and other information needed to display it.

The PDF can be extracted by calling for example an algorithm based method transforming the PDF into split imaged documents which are indexed. The method is configured to loop through the indexed imaged documents and calling the OCR method which performs a loop though the inner page objects; collects the respect text within each of said page objects and returns the string; the string represents the text of the PDF. PDF document analysis method is for example as shown in FIGS. 9-9A. FIGS. 9-9A shows an exemplary PDF abstract class 910, 900. This class is typically an inherited class 915. The PDF abstract class 900 implements the text extract process 925 which produces the output textual content of the PDF document 930. In some embodiment, the PDF is converted to photographic-like images of the document 920. The image can be converted by an OCR process 940 to the textual content of the PDF document instance.

The method performs a loop though the inner page objects i.e. the page items for the image file in hand; collects the respect text within each of said page objects and returns the string; the string represents the text of the TIFF objects. Tiff imaged document object is shown in FIG. 10. FIG. 10 shows an exemplary TIFF abstract class 1000, 1010. This class is typically an inherited class 1015. The TIFF abstract class 1000 implements the text extract process 1020 which produces the output textual content of the PDF document 1030. The image can be converted by an OCR process 1040 to the textual content of the TIFF document instance.

Information can thus be obtained from the documents being docketed. Information can also be extracted in accordance with the following procedure. Where a PDF file is extracted, the PDF can be split into files each containing segments or portions of the PDF file. Where an imaged document (for example a TIFF document) is extracted, the document can be split into files each containing segments or portions of the imaged document file. This enables the procedure of transferring the physical document to the destination where the physical document is docketed.

A .TXT file can be extracted by opening an JO reader stream obtaining a string representing the text of the document, as abstractly shown in FIG. 11. FIG. 11 shows an exemplary TXT abstract class 1100, 1110. This class is typically an inherited class 1115. The TXT abstract class 1100 implements the text extract process 1120 which produces the output textual content of the TXT document 1130.

In some embodiments, a single administrator machine can supervise docketing of multiple remote clients or client locations.

In some embodiments, the documents which are archived include textual content comprising a natural key. This natural key can be a client reference for a content theme of the client office environment. As the system of the present invention can support archiving of multiple clients some of which share content, the system is configured to support duplicate natural keys of different clients. This scenario can occur when multiple clients maintain separate content themes which accidently were chosen to be designated with identical theme reference. This is tackled by attaching an arbitrary string private key for the natural keys registered in the system. In this scenario, destination folder for docketing is selected according to both the identity of the client raising the archiving event and the natural key.

In other embodiment, the system supports multiple administrators. Each administrator is assigned with a client or a logical client zone.

Figure 5B:
FIG. 5B is a file picking application according with the present invention.

FIG. 5B is a content theme and file picking application 5B00 according with the present invention. In some embodiment the content theme and file picking application is installed or executed on a remote client machine. FIG. 5B shows an exemplary use of a ListBox GUI control 5B15. ListBox GUI control shows content themes 5B10.

In some embodiments, the remote client machine is configured and operable to view content themes paired to the destination directory e.g. 5B20. The paired content theme can include parent, child or sibling neighboring content themes as exemplified in a non-limiting manner by 5B20.

In other embodiments, the paired content theme includes contacts 5B35 paired to the content theme. The content themes were queried from a DB module as paired to the viewed content theme.

In other embodiments, the paired content theme includes parent, child or sibling of neighboring content themes 5B20.

In other embodiments, the paired content theme includes information is hot links to parent, child or sibling of neighboring content themes; the hot links provide remote access to the neighboring content themes.

In other embodiments, the paired content theme includes predetermined archived documents 5B30. In other embodiments, the paired content theme includes predetermined system notifications 5B50.

The predetermined system notifications can include dates. The date is retrieved from a DB module. The date is determined from the extracted textual content of said predetermined archived documents.

In one exemplary embodiment, the system of the present invention is an asset management system. Thus, the present invention is directed an asset management system for electronically saving a document in a file system, the system comprising:

an expert archiving machine and a remote client machine; the remote client machine being configured and operable to (1) send the document over LAN, WAN or internet networks; and (2) send an archiving output data signal to the expert archiving machine, and the expert archiving machine being configured and operable: (1) to receive the archiving signal and the document; and (2) to perform a computerized service including: saving the document in a destination directory; thereby forming a saved document. In an embodiment, a file path to the saved document is determined autonomously by a computer procedure in accordance with a predetermined set of conditional archiving rules and an asset parameter data source or database.

In some embodiments, the archiving output data signal is sent in response to a user interface (UI) desktop gesture; the remote client machine being configured and operable to continuously listen to the user interface desktop gesture.

In an embodiment, the execution time, from the sending of the signal until the computerized service terminates and the saved document is formed, does not exceed a time frame of up to at least one selected from the group consisting of 5 seconds, 3 seconds, 2 seconds, 1 seconds, 500 ms, 200 ms or 50 ms.

In some embodiments, the computerized service further comprises querying for an asset parameter in the asset parameter data source being linked to the expert archiving machine, the first asset parameter is indicative of a preferred machine choice for the destination directory; and the destination directory is determined from the preferred machine choice exclusively by the server expert machine.

In some embodiments the computerized service further comprises querying a natural language readable content portion of the document for the asset parameter; the asset parameter is indicative of a preferred machine choice for the destination directory; and the destination directory is determined from the preferred machine choice exclusively by the server expert machine.

In some embodiments, the destination directory of the saved file is visible to the user; thereby allowing the user to view the file path to the destination directory.

In some embodiment, the preferred machine choice for the destination directory comprises documents; wherein at least the majority of the documents are having natural language readable content portion with significant statistical proximity with the asset parameter; and the destination directory is determined from the preferred machine choice.

In an embodiment, the user interface (UI) desktop gesture consists of one single gesture which initiates the computerized archiving service.

Figure 3A:
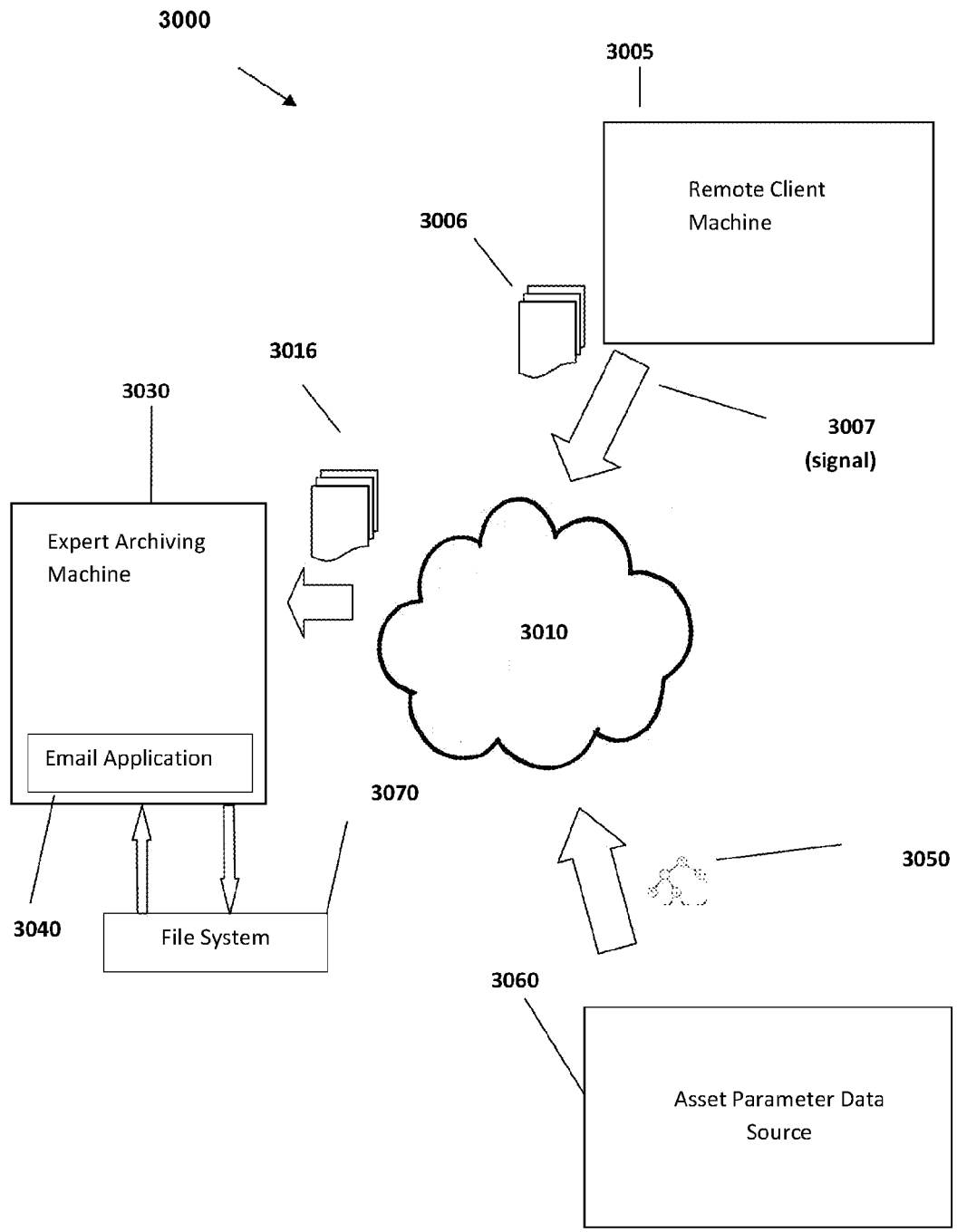
FIG. 3A is a schematic overview of an asset management system in accordance with the present invention.

FIG. 3A depicts an example of a system in accordance with the present invention. FIG. 3A shows an expert archiving machine configured for content receipt, in a networked environment 3000 in accordance with some embodiments. The remote client machine streamlines and provides content 3005 send email documents 3006 to the expert machine. The expert machine 3030 receives the documents 3016. The expert machine optionally utilizes an email application 3040 to open the email documents being sent from the remote client 3005. The documents 3006 can comprise attachments or alternatively comprise file being sent over the internet 3010. The systems of the present invention can process documents or files. In particular, the system and methods described herein provides for processing the natural language portion of the documents and files.

In the present example, the email application further receives data or web feed comprising asset parameter data pieces 3050 and archiving rules. The asset parameter data pieces are maintained in an asset parameter data source, such as an asset parameter database. The asset parameter data source can be communicatively linked to the expert archiving machine or the remote client machine via the internet. Alternatively, the asset parameter data source can be physically linked to either the expert archiving machine or the remote client machine.

In some embodiments, the parameter data pieces is provided and transmitted over the internet from a portfolio asset scheme authority. The email application at the expert archiving machine compiles the documents.

Document compilation comprises obtaining text from the documents. Such obtaining is performed by text extraction methodologies described herein. Following the text extraction the asset parameter data pieces can be detected in the extracted text using string alignment procedures/regular expression matching. The string alignment process is performed autonomously by a computer during the archiving service of the present invention. If an asset parameter is detected, the asset parameter data source is queried and file system commands are retrieved from the asset parameter data source. The asset parameter data source can comprise both the asset parameter data piece and the archiving rules. In some embodiment, the asset parameter data source includes the archiving rule.

The asset parameter data source can comprise a data set of rule constructs comprising asset parameter data pieces and cross matched file system commands. The file system commands utilize destination directories for saving the received documents. Such utilization of the destination directories is performed autonomously.

The file system commands can include file system Create Directory commands, File Write/Copy commands, and file path strings pointing at optional destination directories.

The output of the document compilation is file system commands which are executed to save the documents. In addition, the output can be visualization of the document including the autonomously selected file path/destination directories.

Figure 5C:
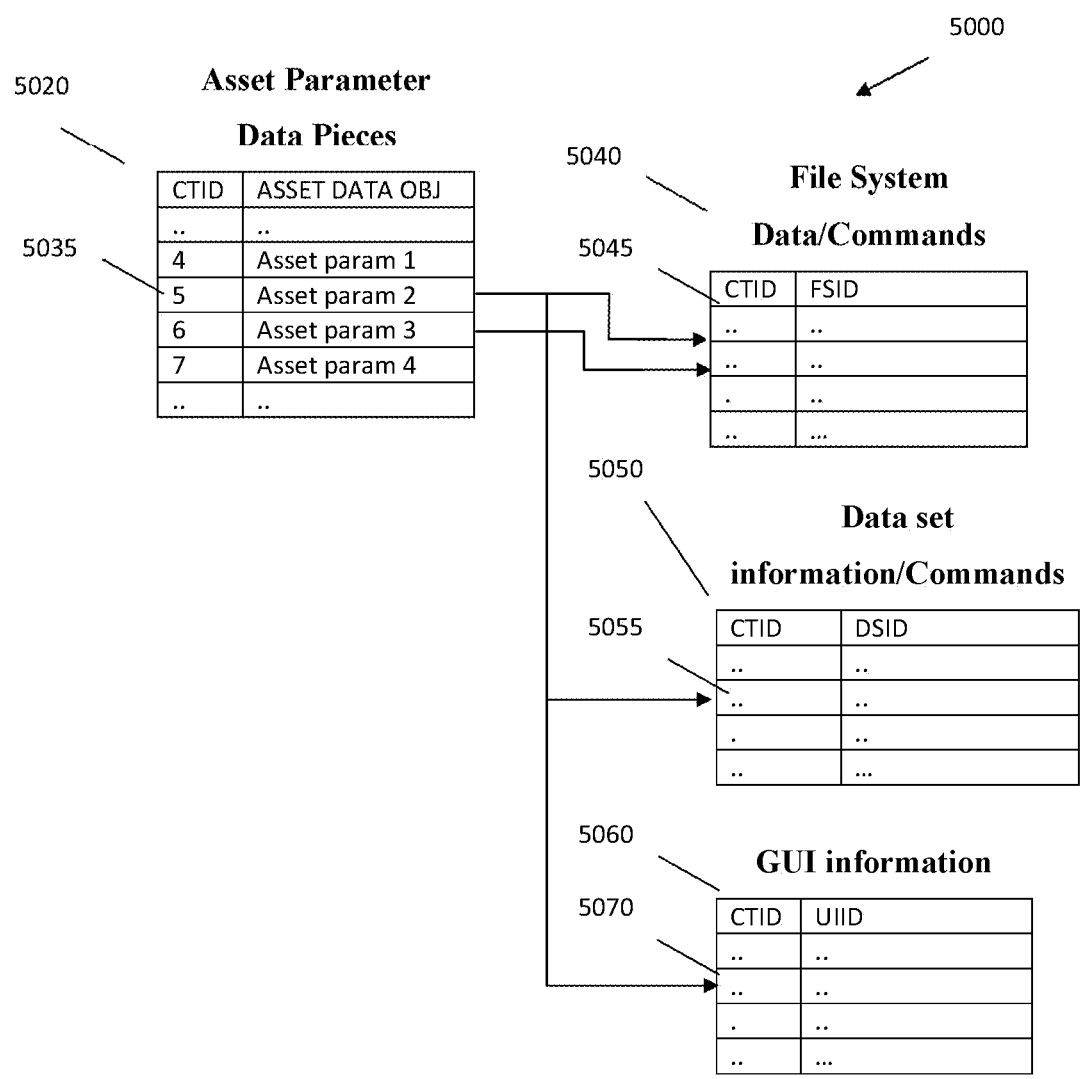
FIG. 5C illustrates an exemplary table structure of an asset parameter data source according to the present invention.

FIG. 5C illustrates an exemplary table structure 5000 of an asset parameter data source according to the present invention. An application according to embodiments may employ one or more tables or data tables to store asset data objects 5020 and related file system 5040, dataset 5050 and visualization information 5060. Some exemplary tables are conceptually illustrated in diagram 5000. The asset parameter data source can be provided through the internet as a web or network feed.

As stated herein, asset parameter data source comprises asset data object allocated items (or asset parameter data pieces). Asset parameter data pieces are enumerated at table

5020. Each piece may comprise a Asset Data id (CTID) and a assert parameter object name 5035. Each asset data piece may be mapped or cross-matched to either file system data 5040, data set information 5050 or/and GUI information 5060. The file system data comprises paring a asset parameter data pieces or CTID to file system commands 5040 and optionally file system executables identified for example by file system id (FSID). The file system command can cause the expert archiving machine to save a received email (or other document) at a destination directory designed for the asset parameter data piece. The destination directory can be a node in a folder structure used for visualizing the content theme collection.

The data set information comprises paring between asset parameter data piece to dataset queries or commands 5055 and optionally dataset executables identified by data set information id (DSID). The data set command can insert asset related information to a data table for docketing the asset related information. As the email or documents are accumulated data tables accumulate data describing the assets.

The Graphical user interface information comprises paring between asset parameter data pieces to user interface commands and GUI configurations 5065. The user interface commands can associate for example assets to particular graphical icons. In addition, the user interface commands can direct the email application to employ a graphical user control or a graphical user form to visualize the asset.

Figure 5D:
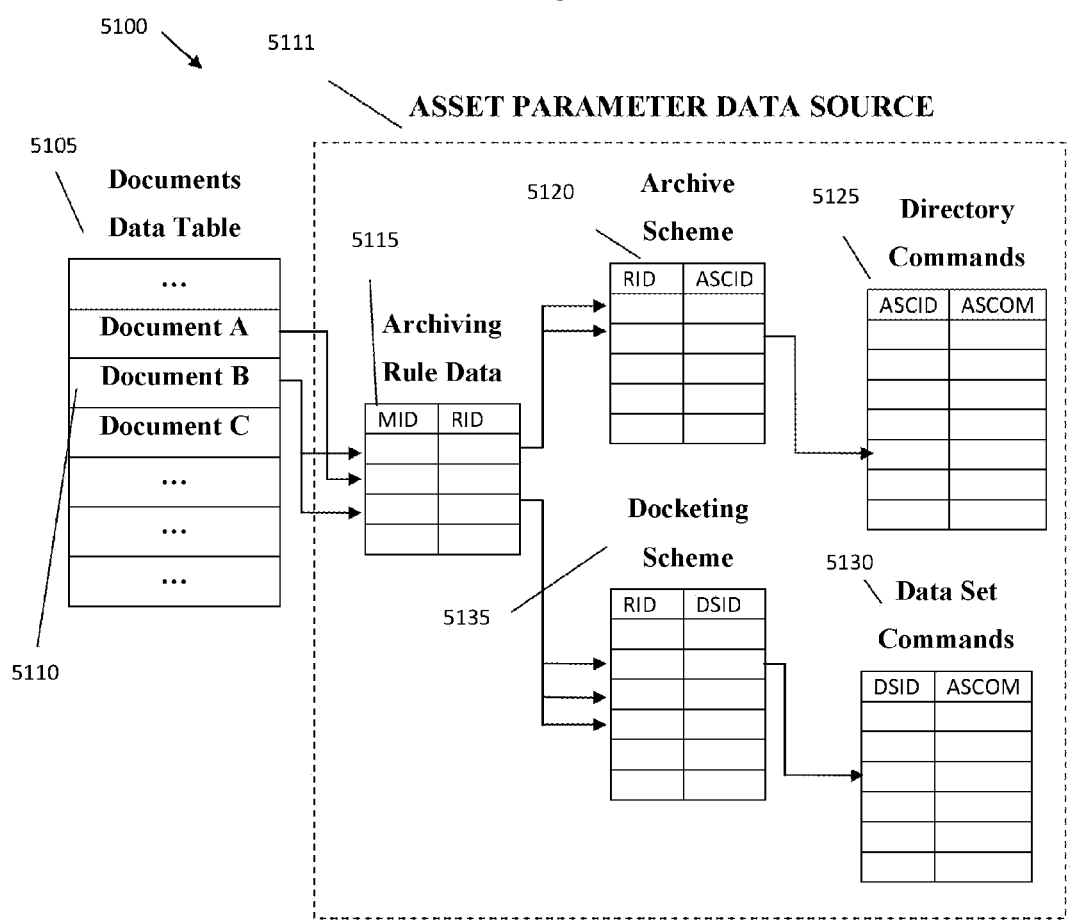
FIG. 5D illustrates an exemplary table structure of archiving rules of the present invention.

FIG. 5D illustrates an exemplary table structure 5100 of archiving rules of the present invention. The asset parameter data source 5111 comprises the archiving rules. Some example tables are conceptually illustrated in diagram 5100. The archiving rules can be received by the expert archiving machine via a web or network feed.

Table 5105 may be employed to store and/or view documents 5110. Each document may be provided with an id (MID). The email application at the expert machine can utilize the archiving rules. The archiving rules may be located in table structure 5115 stored in the asset parameter data source 5111. The table 5115 can cross-match the documents to the appropriate archiving rules. Each archiving rule can be provided with a Rule Identification (RID). The cross-matching of the archiving rules to documents enables detection of documents which satisfied the archiving rules.

In embodiments of the present invention the archiving rules or RIDs can be paired to respective file system commands or executable. The respective file system commands or executable can be stored for example in table 5120. The latter are typically assigned with Archive Scheme Identification (ASID). Each of the ASID can be mapped to the destination directory or another file system commands 5125 (ASCOM). The destination directory is typically represented by a character string making the path to the destination directory.

The file system command can cause the expert archiving machine to save the received document 5110 in the destination directory being cross-matched by the respective RID. The destination directory can be a node in a directory structure used for visualizing the document collection 5105.

Cross-matching of the documents 5105 with the RID and optionally the ASCID is performed as described herein: extracting text portions from the document; detecting a matching asset parameter in the asset parameter data source 5111 via dataset query, i.e. performed at table 5115; retrieving form the table the matching RID and ASID; and retrieving the respective file system commands such as the path to the destination directory for the saved file together with the appropriate file system commands.

In embodiments of the present invention the archiving rules can be paired to respective data set commands or executable. These can also be referred to in the present invention as docketing rules. The docketing rule table exemplification is shown as table 5135. The data set rules can be paired to data set scheme items. The latter are typically assigned with Data Set Identification (DSID). Each of the DSID can be mapped to preset data set commands or queries 5130 (DSCOM).

In another aspect, the present invention is directed computer-implemented method for saving a document in a file system, the method comprising:
   (a) receiving an archiving output data signal and the document; and
   (b) performing a computerized service including: saving the document in a destination directory; thereby forming a saved document; wherein a file path to the saved document is determined autonomously by a computer procedure in accordance with a predetermined set of conditional archiving rules and an asset parameter data source or database.

The archiving output data signal can be sent in response to a user interface (UI) desktop gesture; and the user interface desktop gesture can be detected via a continuous computer-implemented method listening thereto.

In an embodiment, the execution time, from the receiving of the archiving output data signal until the computerized service terminates and the saved document is formed, does not exceed a time frame of up to at least one selected from the group consisting of 5 seconds, 3 seconds, 2 seconds, 1 seconds, 500 ms, 200 ms or 50 ms.

In some embodiments, the computerized service further comprises querying for an asset parameter form the asset parameter data source, the first asset parameter is indicative of a preferred machine choice for the destination directory; and the destination directory is determined autonomously from the preferred machine choice.

In some embodiments, the computerized service further comprises querying a natural language readable content portion of the document for the asset parameter; the asset parameter is indicative of a preferred machine choice for the destination directory; and the destination directory is determined autonomously from the preferred machine choice.

The computerized service can further comprise querying a natural language readable content portion of the document for the asset parameter; the asset parameter is indicative of a preferred machine choice for the destination directory; and the destination directory is determined from the preferred machine choice.

The destination directory of the saved file can be visible to the user; thereby allowing the user to view the file path to the destination directory ex post facto.

The user interface (UI) desktop gesture can consist of one single gesture which initiates the computerized service.

In some embodiments, said computerized service can continuously executed at least until the document is saved in the destination directory.

In some embodiments, the user cannot interrupt, delete, intervene or cancel said computerized service at least until document is saved in the destination directory.

The destination directory can be a parent, child or sibling directory of a second destination directory.

The computerized service can exclude user intervention at least until the document is saved in the destination directory.

The receiving of the document over LAN, WAN or internet networks can be performed over Post Office Protocol (POP), POP3 or a mail server protocol complying with POP standards.

The method can be executed on a virtual machine via remote desktop data protocol. The server remote desktop data protocol can be a Microsoft Remote Desktop Protocol (RDP).

In some embodiments, the destination directory comprises documents; wherein at least the majority of the documents are having natural language readable content portion comprising strings of characters indicative of the asset parameter.

In a third aspect, the present invention is directed to a machine-readable storage medium comprising machine-readable instructions for causing a processor to execute a computer-implemented method for saving a document in a file system, the method comprising:

(a) receiving an archiving signal and the document; and
(b) performing a computerized service including: saving the document in a destination directory; thereby forming a saved document; wherein a file path to the saved document is determined autonomously by a computer procedure in accordance with a predetermined set of conditional archiving rules and an asset parameter data source or database.

The archiving output data signal can be sent in response to a user interface (UI) desktop gesture; and the user interface desktop gesture can be detected via a continuous computer-implemented method listening thereto.

In an embodiment, the execution time, from the receiving of the archiving output data signal until the computerized service terminates and the saved document is formed, does not exceed a time frame of up to at least one selected from the group consisting of 5 seconds, 3 seconds, 2 seconds, 1 seconds, 500 ms, 200 ms or 50 ms.

In some embodiments, the computerized service further comprises querying for an asset parameter in the asset parameter data source being linked to the expert archiving machine, the first asset parameter is indicative of a preferred machine choice for the destination directory; and the destination directory is determined autonomously from the preferred machine choice.

In some embodiments the computerized service further comprises querying a natural language readable content portion of the document for the asset parameter; the asset parameter is indicative of a preferred machine choice for the destination directory; and the destination directory is determined autonomously from the preferred machine choice.

The computerized service can further comprise querying a natural language readable content portion of the document for the asset parameter; the asset parameter is indicative of a preferred machine choice for the destination directory; and the destination directory is determined from the preferred machine choice.

The destination directory of the saved file can be visible to the user; thereby allowing the user to view the file path to the destination directory ex post facto.

The user interface (UI) desktop gesture can consist of one single gesture which initiates the computerized service.

In some embodiments, said computerized service can continuously executed at least until the document is saved in the destination directory.

In some embodiments, the user cannot interrupt, delete, intervene or cancel said computerized service at least until document is saved in the destination directory.

The destination directory can be a parent, child or sibling directory of a second destination directory.

The computerized service can exclude user intervention at least until the document is saved in the destination directory.

The receiving of the document over LAN, WAN or internet networks can be performed over Post Office Protocol (POP), POP3 or a mail server protocol complying with POP standards.

The method can be executed on a virtual machine via remote desktop data protocol. The server remote desktop data protocol can be a Microsoft Remote Desktop Protocol (RDP).

In some embodiments, the destination directory comprises documents; wherein at least the majority of the documents are having natural language readable content portion comprising strings of characters indicative of the asset parameter.

FIG. 5E is an action diagram illustrating example interaction between an application and as asset parameter database according to embodiments. Diagram 5200 displays the interactions between for example the email application 5210, web service 5220 and the asset parameter database 5230.

In exemplary settings, the application 5210 can initiate a process with an asset parameter data piece request 5215, upon which the web service 5220 may send a query to the asset parameter database 5230 by querying data 5222. The asset parameter database 5230 may respond by returning asset parameter data piece 5224. Thereafter, the web service may respond with respect to email application with transmitting asset parameter data piece 5216.

In embodiments of the present invention, the web service 5220 may submit a query to the asset parameter database 5230 by querying archiving rules data 5226. The asset parameter database 5230 may respond by returning data collection of archiving rules data 5228. The web service may respond with respect to the email application with sending archiving rules data 5217.

Optionally, in embodiments, a flow of emails received by the email application 5210 apply the asset parameter data pieces and archiving rule data piece 5219.

Figure 5F:
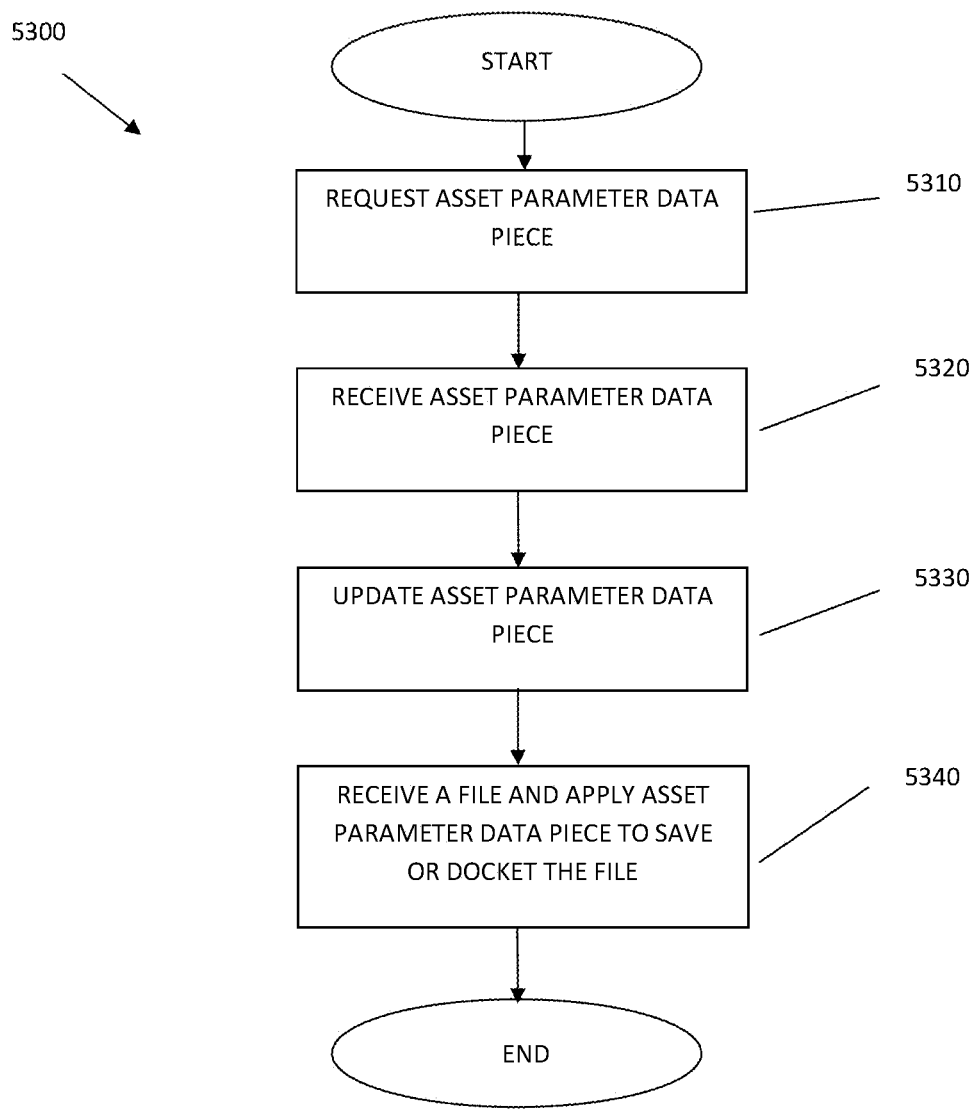
FIG. 5F is a logic flow diagram depicting an exemplary processing of a document by an expert archiving machine.

FIG. 5F is a logic flow diagram for a process 5300 for processing a file or document at an exemplary setup of an expert archiving machine. At operation 5310 a request for an asset parameter data piece is provided. As the data piece is received at operation 5320 by the expert machine, it enables for example autonomous compilation of a flow of emails/documents being received from a remote client machine. The methods for processing emails according to the asset parameter data source were already provided herein above.

At operation 5330 the expert machine can be updated with the asset parameter data pieces. Thereafter, an operation 5340 for applying the asset parameter data pieces at the expert machine can follow. Operation 5340 can include a step of receiving a file over the internet and apply the asset parameter data piece to compile the file e.g. an email. The compilation of the file/document is performed autonomously.

FIG. 5G depicts a schematic overview of an exemplary destination directories collection and structure 5400 according to embodiments. Child destination directory 5415 is a mere example. In the present invention, destination directory items can be arranged in a hierarchal structure as shown i.e. the relations of destination directories are represented by a graph data structure (or specifically by a tree data structure).

By way of non-limiting example, diagram 5400 shows a graph having destination directories instances as nodes 5405, 5415, 5410, 5430 and 5440. The relationship between destination directories is represented by an edge which connects the respective destination directories. For example, the destination directory 5415 is a child of destination directory 5405; destination directory 5430 is a sibling of destination directory 5440; the parent of both is the destination directory 710.

The invention claimed is:

1. Asset management system used for electronically saving a document in a file system, the system comprising:
an expert archiving machine and a remote client machine; the remote client machine being configured and operable to (1) send the document over LAN, WAN or internet networks; and (2) send an archiving output data signal to the expert archiving machine, and the expert archiving machine being configured and operable: (1) to receive the archiving signal and the document; and (2) to perform a computerized service including: saving the document in a destination directory; thereby forming a saved document;
wherein a file path to the saved document is determined autonomously by a computer procedure in accordance with a predetermined set of conditional archiving rules and an asset parameter data source or database; and
wherein the computerized service further comprises querying a natural language readable content portion of the document for an asset parameter; the asset parameter is indicative of a preferred machine choice for the destination directory; and the destination directory is determined from the preferred machine choice exclusively by the expert archiving machine.

2. The asset management system of claim 1 wherein the archiving output data signal is sent in response to a user interface (UI) desktop gesture; the remote client machine being configured and operable to continuously listen to the user interface desktop gesture.

3. The asset management system of claim 1 wherein an execution time, from the sending of the signal until the computerized service terminates and the saved document is formed, does not exceed a time frame of up to at least one selected from the group consisting of 5 seconds, 3 seconds, 2 seconds, 1 seconds, 500 ms, 200 ms or 50 ms.

4. The asset management system of claim 1 wherein the computerized service further comprises querying for an asset parameter in the asset parameter data source being linked to the expert archiving machine, the first asset parameter is indicative of a preferred machine choice for the destination directory; and the destination directory is determined from the preferred machine choice exclusively by the server expert archiving machine.

5. The asset management system of claim 1 wherein the destination directory of the saved file is visible to the user; thereby allowing the user to view the file path to the destination directory.

6. The asset management system of claim 1 wherein the user interface (UI) desktop gesture consists of one single gesture which initiates the computerized archiving service.

7. The asset management system of claim 1 wherein said computerized service is continuously executed at least until the document is saved in the destination directory.

8. The asset management system of claim 1 wherein the remote client machine and user cannot interrupt, delete, intervene or cancel said computerized service at least until document is saved in the destination directory.

9. The asset management system of claim 1 wherein the destination directory is a parent, child or sibling directory of a second destination directory.

10. The asset management system of claim 1 wherein the computerized service excludes user intervention at least until the document is saved in the destination directory.

11. The asset management system of claim 1 wherein the sending of the document over LAN, WAN or internet networks is performed over Post Office Protocol (POP), POP3 or a mail server protocol complying with POP standards.

12. The asset management system of claim 1 wherein the remote client machine is a virtual machine communicating with the expert archiving machine via remote desktop data protocol.

13. The asset management system of claim 12 wherein the server remote desktop data protocol is Microsoft Remote Desktop Protocol (RDP).

14. The asset management system of claim 1 wherein the destination directory comprises documents; wherein at least the majority of the documents are having natural language readable content portion comprising strings of characters indicative of the asset parameter.

* * * * *